United States Patent [19]

White, III et al.

[11] Patent Number: 4,823,976

[45] Date of Patent: Apr. 25, 1989

[54] QUICK ACTUATING CLOSURE

[75] Inventors: Dorsey E. White, III, Poquoson; Benjamin T. Updike, deceased, late of Newport News, by Barbara G. Updike, legal representative; Johnny W. Allred, Newport News, all of Va.

[73] Assignee: The United States of America as represented by the Administrator of the National Aeronautics and Space Administration, Washington, D.C.

[21] Appl. No.: 190,186

[22] Filed: May 4, 1988

[51] Int. Cl.⁴ .................................................. B65D 55/00
[52] U.S. Cl. .................................... 220/211; 220/315; 220/3
[58] Field of Search .................... 220/3, 211, 315, 319, 220/245, 327; 49/26, 28, 54, 56; 292/256.71

[56] References Cited

U.S. PATENT DOCUMENTS

| | | |
|---|---|---|
| 1,350,666 | 8/1920 | Murphy . |
| 2,690,276 | 9/1954 | Alt . |
| 2,822,109 | 2/1958 | Tanguard . |
| 2,877,921 | 3/1959 | Grim ................................ 220/211 |
| 3,185,337 | 5/1965 | Long . |
| 3,437,230 | 4/1969 | Savory . |
| 3,568,379 | 3/1971 | Johnsson et al. . |
| 4,240,561 | 12/1980 | Hagstrom et al. . |
| 4,437,578 | 3/1984 | Bienek et al. . |
| 4,512,496 | 4/1985 | Tsou . |
| 4,519,519 | 5/1985 | Meuschke et al. ................. 220/211 |
| 4,565,297 | 1/1986 | Korner et al. . |
| 4,669,628 | 6/1987 | Hatta ................................. 220/211 |

Primary Examiner—George T. Hall
Attorney, Agent, or Firm—George F. Helfrich; John R. Manning; Charles E. B. Glenn

[57] ABSTRACT

A quick actuating closure for a pressure vessel 80 in which a wedge ring 30 with a conical outer surface 31 is moved forward to force shear blocks 40, with conical inner surfaces 41, radially outward to lock an end closure plug 70 within an opening 81 in the pressure vessel 80. A seal ring 60 and a preload ramp 50 sit between the shear blocks 40 and the end closure plug 70 to provide a backup sealing capability. Conical surfaces 44 and 55 of the preload ramp 50 and the shear blocks 40 interact to force the seal ring 60 into shoulders 73 and 85 in the end closure plug 70 and opening 81 to form a tight seal. The end closure plug 70 is unlocked by moving the wedge ring 30 rearward, which causes "T"-bars 32 of the wedge ring 30 riding within "T"-slots 42 of the shear blocks 40 to force them radially inward. The end closure plug 70 is then removed, allowing access to the interior of the pressure vessel 80.

10 Claims, 9 Drawing Sheets

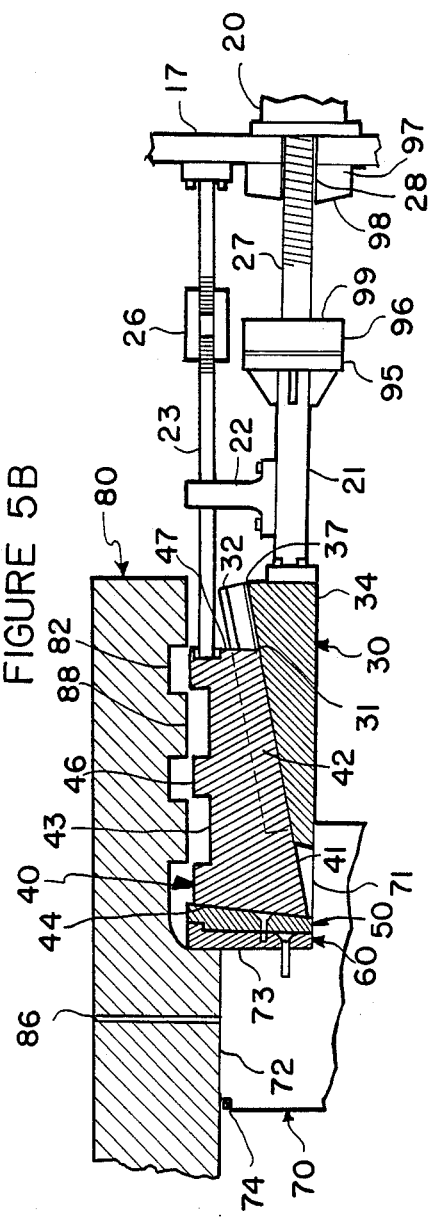
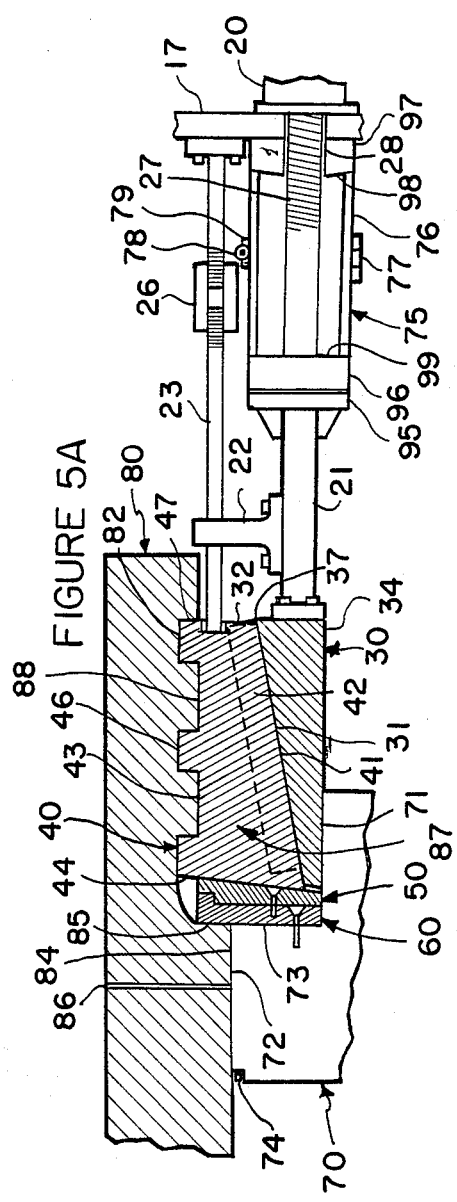

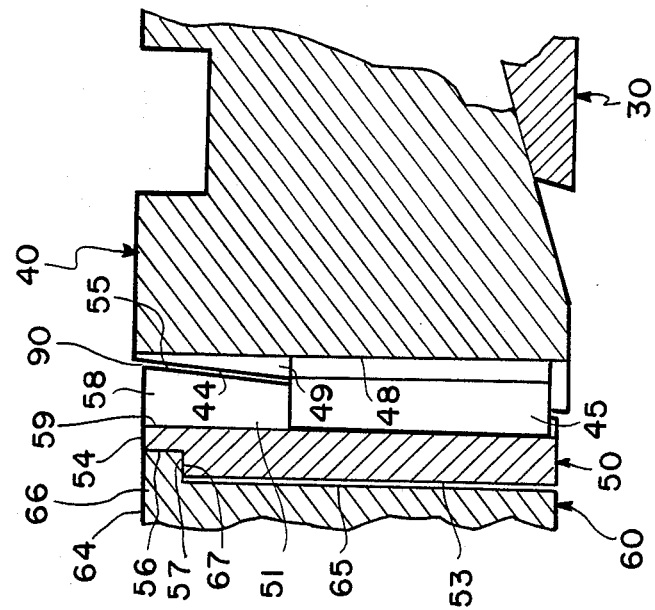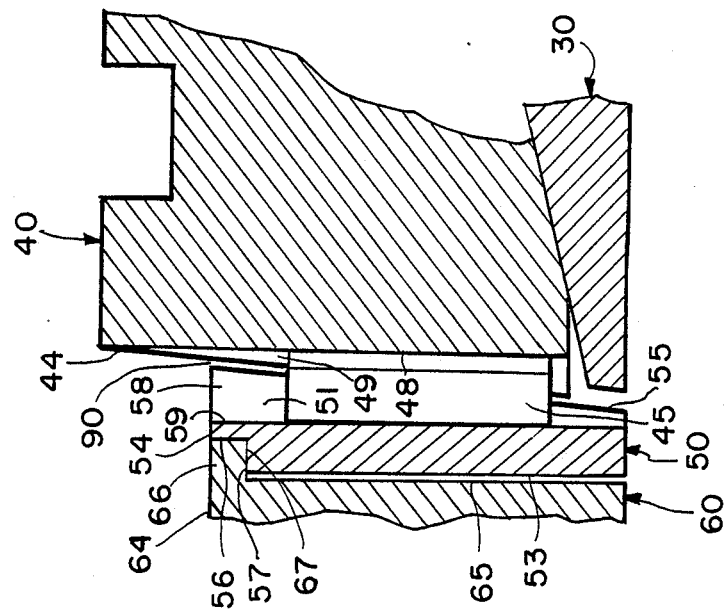

QUICK ACTUATING CLOSURE

ORIGIN OF THE INVENTION

The invention described herein was made by employees of the United States Government and may be manufactured and used by or for the Government for governmental purposes without the payment of any royalties thereon or therefor.

FIELD OF THE INVENTION

The present invention relates to closures for high pressure vessels and particularly to quick actuating closures

BACKGROUND OF THE INVENTION

Pressure vessels often require access to their interiors for inspection or other servicing. Access openings must be provided in these vessels to accomplish this. Any closure device that seals these openings must be relatively easy to open and close, and must be able to withstand the internal pressure of the vessel with no leakage of liquid or gas.

Prior methods of meeting these two requirements have been time-consuming, and have required considerable use of equipment and manpower to obtain access to the inside of the vessel. The use of a closure based on U.S. Pat. No. 2,690,275, by Alt et al, is an example of this problem. After twenty-four 1⅞" diameter×24" long bolts are first removed, a "holding" ring is removed using an overhead crane. Forty-six 1¾" diameter×19¾" long bolts are then removed from a sixteen piece segmented "shear" ring. The overhead crane is then used to remove the sixteen pieces of the shear ring, a "backup" ring, a "seal" ring, and a cover. This procedure requires special handling fixtures, the removal of seventy bolts, and the storage and identification of a number of parts.

Another disadvantage of closures like the one referred to above is that deflection of the pressure shell under hydrostatic pressure allows the sealing surfaces to be underloaded. The bolts of the shear ring must therefore be retorqued after pressure is applied.

OBJECTS OF THE INVENTION

It is an object of this invention to provide a closure system that can be attached to and removed from a pressure vessel with a minimum of equipment, manpower, storage space, and time, so that pressure vessel entries and inspections can be made frequently and easily.

It is a further object of this invention to provide a pressure vessel closure that does not require any retorquing after pressure is applied.

Other objects and advantages of the invention will become apparent hereinafter in the specification and drawings which follow.

SUMMARY OF THE INVENTION

According to the present invention, the foregoing and additional objects are obtained by providing a quick actuating closure for a pressure vessel. It is comprised of a wedge ring that has a conical outer surface, which is vertically supported and axially slidable. Means are attached to move it forward and rearward. A plurality of shear blocks, having conical inner surfaces and annularly grooved outer surfaces, together fit around the wedge ring. The conical surfaces of the wedge ring and the shear block are situated so that forward movement of the wedge ring causes radially outward movement of the shear blocks. Protruding and receiving means between the conical surfaces are provided to both restrict rotational movement, and to cause radially inward movement of the shear block from a rearward movement of the wedge ring.

An opening is provided in the pressure vessel, with an axial wall having annular flanges protruding therefrom sized to fit within the grooved outer surfaces of the shear blocks. It also has a rearward facing shoulder forward of the annular flanges. An end closure plug fits within the opening, with means to seal it, and with a rearward facing peripheral shoulder aligned with the shoulder of the opening.

A seal ring and a preload ramp are disposed between the shoulder of the end closure plug and the shear blocks, through which rearward pressure acting on the end closure plug is transmitted to the shear blocks into the axial wall of the opening. The seal ring has a forward surface contacting both the shoulder of the end closure plug and the shoulder at the opening, with seal means disposed between each surface. It also has a peripheral lip extending rearwardly. The preload ramp has a forward surface contacting the seal ring, with a peripheral notch in which the peripheral lip of the seal ring is disposed.

Both the rearward surface of the preload ramp, and the forward surfaces of the shear blocks are conical, and are sized so that a clearance exists between them of such magnitude that radially outward movement of the shear blocks will cause the conical surfaces to contact each other when the grooved outer surfaces of the shear blocks contact the axial wall of the opening. The conical forward surfaces of the shear blocks and the conical rearward surface of the preload ramp have protruding and receiving means therebetween to radially guide the shear block inward and outward.

To close the opening, the wedge ring is moved forward to force the shear blocks radially outward until the grooved surfaces of the shear blocks contact the forward facing surfaces of the annular flanges. This movement is guided longitudinally by the protruding and receiving means between the wedge ring and the shear blocks, and radially by the protruding and receiving means between the shear blocks and the preload ramp. When the clearance between the shear blocks and the preload ramp is zero, the shear blocks travel slightly rearward, forcing the rearward facing radial surfaces of the grooves to contact the annular flanges, tightly securing the end closure plug within the opening.

Pressure may then be applied to the interior of the pressure vessel. To backup the primary seal of the end closure plug, rearward pressure on the end closure plug causes interaction between the shear blocks, the preload ramp, and the seal ring to force the seal ring into the shoulders of the opening and the end closure plug, to effectuate a tight seal.

With the pressure vessel unpressurized, the opening is opened by moving the wedge ring rearward. The interaction between the protruding and receiving means forces the shear blocks radially inward until the shear blocks clear the flanges on the axial wall of the opening. The end closure plug is then removed to obtain access into the interior of the pressure vessel.

BRIEF DESCRIPTION OF THE DRAWINGS

FIG. 5 is a cut-away side view of the invention forward of the vertical plate, with FIG. 5(a) showing the invention locked, and FIG. 5(b) showing the invention unlocked;

FIG. 9 is a cut-away close-up side view of the parts shown in FIG. 8, but rotated to show a forward tee bar and a tee guide, with FIG. 9(a) showing the invention locked, and FIG. 9(b) showing the invention unlocked.

DETAILED DESCRIPTION OF THE INVENTION

Figure 1:
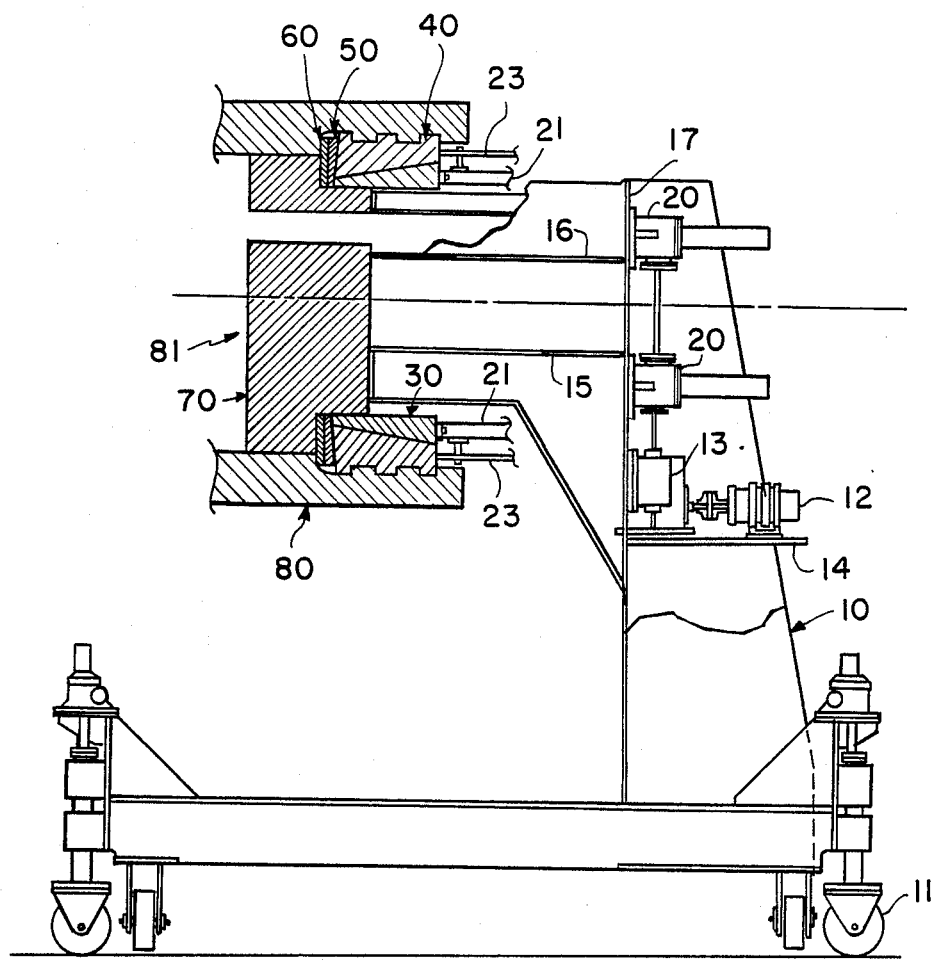
FIG. 1 is a partial cut-away side view of the invention in a locked position, with the cross-hatched portion rotated 45° from its actual position.

Referring now to FIG. 1, the invention includes a cart assembly 10 which supports the other parts of the invention including screw jacks 20, a wedge ring 30, shear blocks 40, a preload ramp 50, a seal ring 60, and an end closure plug 70. Note that the cross-hatched areas of FIG. 1 are turned 45° from their actual position, as will be seen in later drawings. All of these parts operate together, as described below, to seal a standard pressure vessel 80 equipped with an opening 81 designed according to the present invention.

Figure 2:
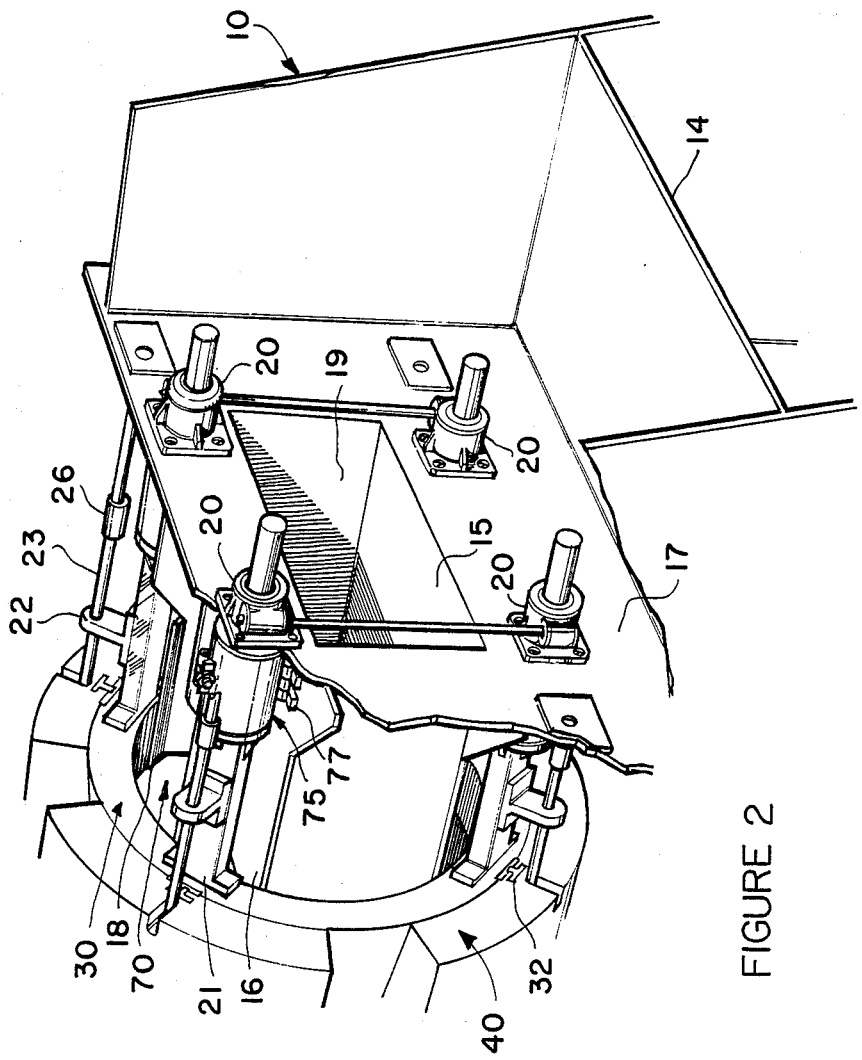
FIG. 2 is a perspective view of the exterior parts of the invention in a locked position.

The cart assembly 10 is supported by four wheel assemblies 11 that make it mobile. The supporting structure includes a vertical plate 17 with a main shelf 14 attached thereto. An air motor 12 is attached to the main shelf 14, and is connected to a supply of low pressure shop air (not shown). Two gear boxes 13, and four screw jacks 20 are attached to the vertical plate 17, and are interconnected such that the air motor 12 may drive the screw jacks 20 via the gear boxes 13. Referring now to FIG. 2, a box structure 19 is attached to and protrudes forward from the vertical plate 17. Note that in this specification, "forward" denotes the longitudinal direction toward the pressure vessel 80, "rearward" denotes the longitudinal direction away from the pressure vessel 80, "outward" denotes the radially outward direction, and "inward" denotes the radially inward direction.

The box structure 19 has the end closure plug 70 (described below) attached at its forward end. The box structure 19 includes a lower horizontal plate 15 and an upper horizontal plate 16, each having two wedge ring supports 18 attached thereto. The four wedge ring supports 18 fit within the inner surface of the wedge ring 30 (described below) for support, and are designed so that the wedge ring 30 can easily move forward and rearward.

Figure 3:
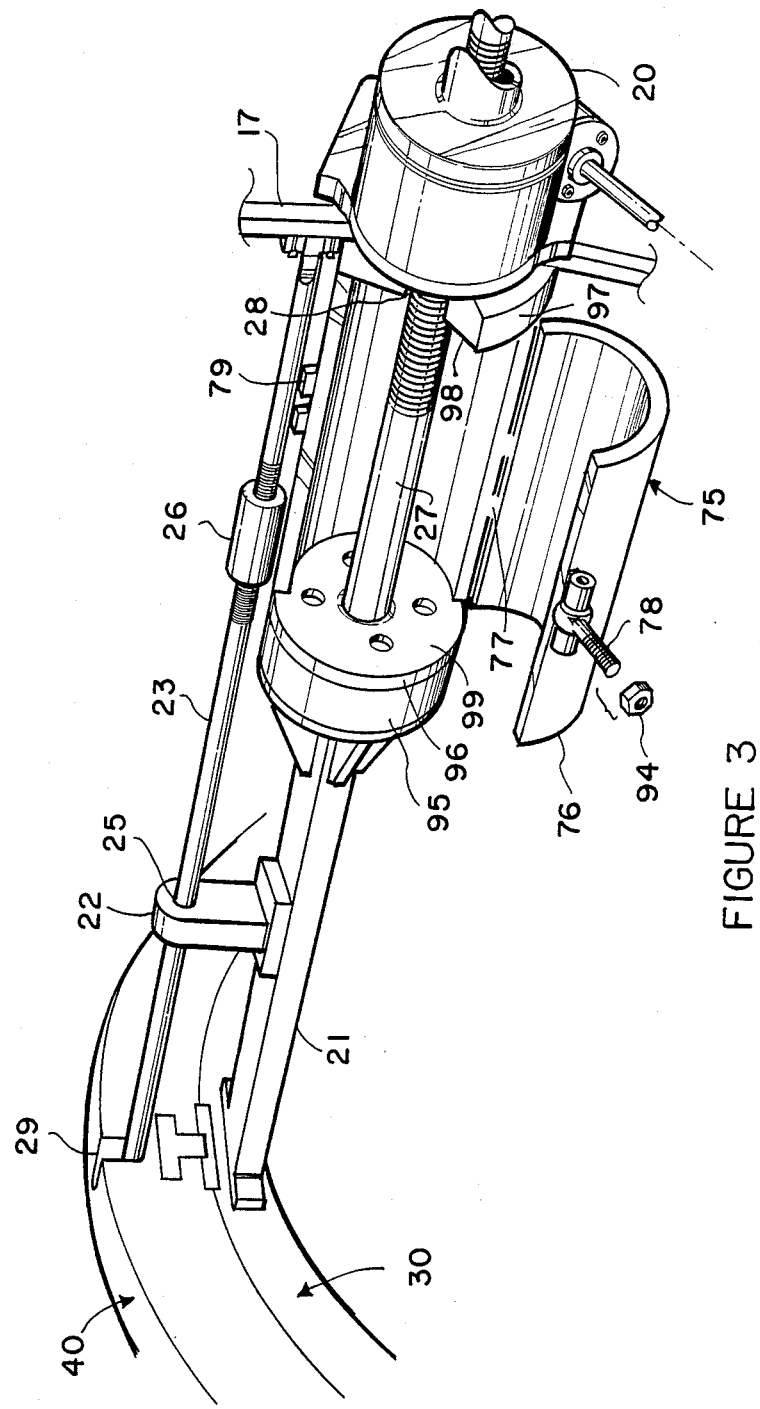
FIG. 3 is a close-up perspective view of the locking assembly, connecting rod, and adjustable rod which are shown in FIG. 2.

Referring now to FIG. 3, four screw jack shafts 27 each pass through openings 28 in vertical plate 17. The screw jack shafts 27 communicate with the screw jacks 20 on the rearward side of the vertical plate 17 to move them forward and rearward. Each screw jack shaft 27 has a flange 96 on its forward end which is connected to a connecting rod 21, via a connecting rod flange 95, and communicates with a locking assembly 75 (described below). The connecting rod 21 is attached on its forward end to the wedge ring 30. This accomplishes a physical connection between the screw jacks 20 and the wedge ring 30, so that the operation of the screw jacks 20 moves the wedge ring 30 forward and rearward.

Each connecting rod 21 has a guide 22 attached on its outward side. The guide 22 has a longitudinal hole 25 through which an adjustable rod 23, attached to the wall 17, projects. The adjustable rod 23 is kept parallel with the arm 21 by the guide 22, and contains a left-hand, right-hand threaded nut 26 for length adjustment. The forward end of the adjustable rod 23 fits within a notch 29 in the shear blocks 40 (described below).

Figure 4:
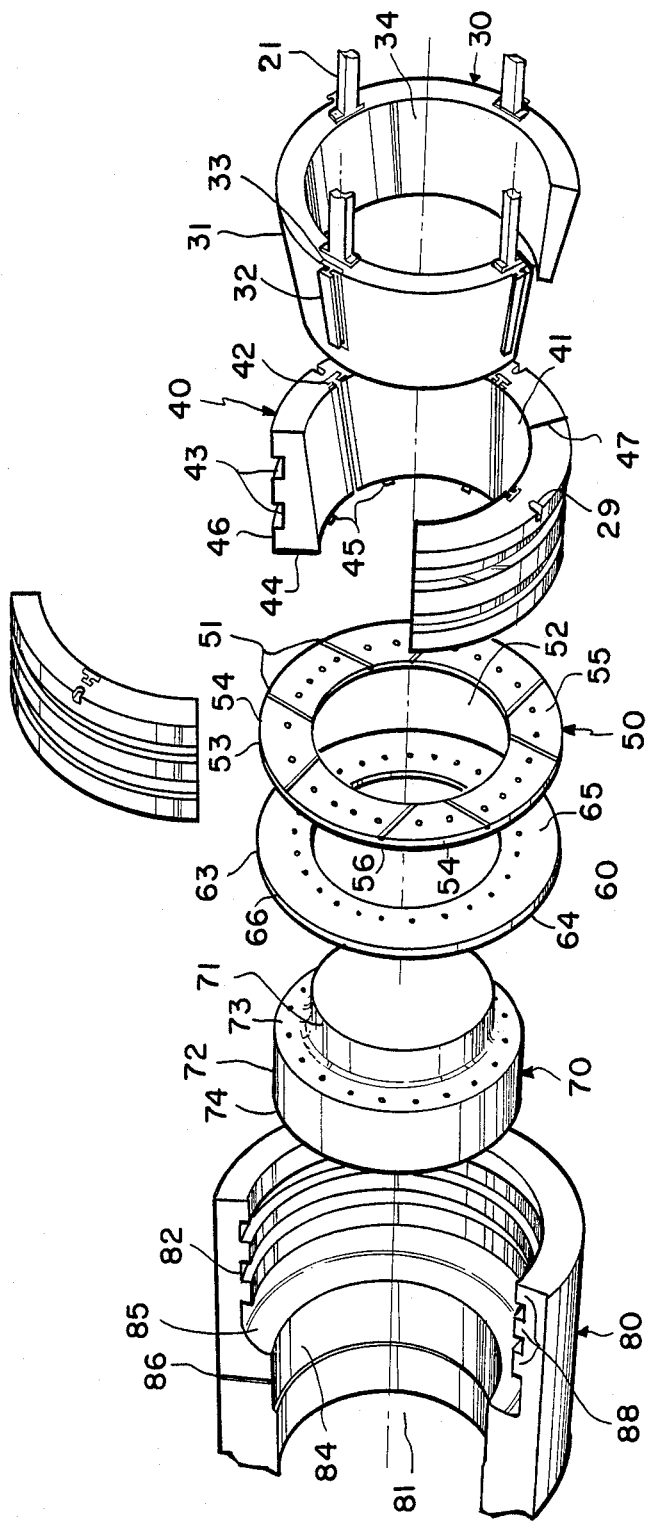
FIG. 4 is a perspective view of the individual internal parts of the invention.

The wedge ring 30 interacts with a number of other components to either seal or unseal the opening 81 of the pressure vessel 80. This interaction will be explained after each component is described in detail. FIG. 4 shows these other components separately, and FIG. 5(a) shows them as they fit together in the locked position.

Figure 6:
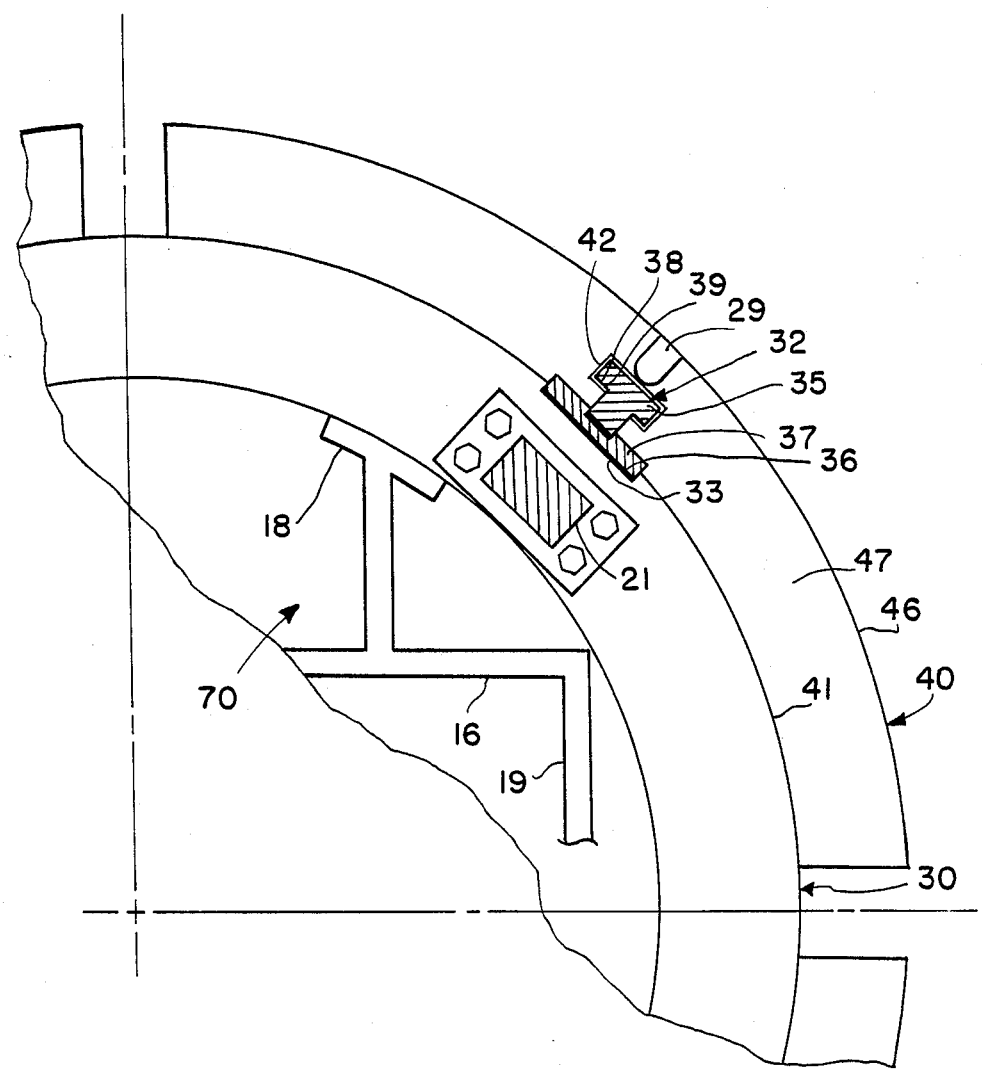
FIG. 6 is a close-up front view of the wedge ring, shear block, and tee-bar assembly which are shown in FIG. 5.

Referring now to FIG. 4, the wedge ring 30 has a cylindrical inner surface 34 and a conical outer surface 31, with the distance between these two surfaces increasing in the rearward direction. Attached to the wedge ring 30 are four tee bar assemblies 32, spaced 90° apart. The four imaginary radial lines from the geometric center of the wedge ring 30 extending outward through the tee bar assemblies 32 will be referenced throughout this specification, and will be referred to as the "reference lines". The tee bar assemblies are mounted in rectangular recesses 33 machined in the outer surface 31. Details are shown in FIG. 6. Each tee bar assembly 32 consists of a tee bar 35, shims 36, and a mounting plate 37. The tee bar assemblies 32 are attached as a unit within the recesses 33 by standard means such as screws.

Referring again to FIG. 4, four shear blocks 40 fit around the wedge ring 30, and form a hollow, somewhat cylindrical tube when put together. Each shear block 40 is formed by a conical inner surface 41, a cylindrical outer surface 46, a conical forward surface 44, and a rearward surface 47 perpendicular to the outer surface 46. The distance between the conical inner surface 41 and the cylindrical outer surface 46 increases in the forward direction, and the distance between the conical forward surface 44 and the rearward surface 47 decreases in the outward direction. Each shear block 40 has one tee slot 42 cut out along the inner surface 41, spaced and machined so that the tee bar assemblies 32, fit within. Each shear block 40 also has a notch 29 cut out of the rearward surface 47 adjacent to each tee slot 42, within which fit the forward end of each adjustable rod 23 (not shown). Details of both the tee slot 42 and the notch 29 are shown in FIG. 6.

Figure 7:
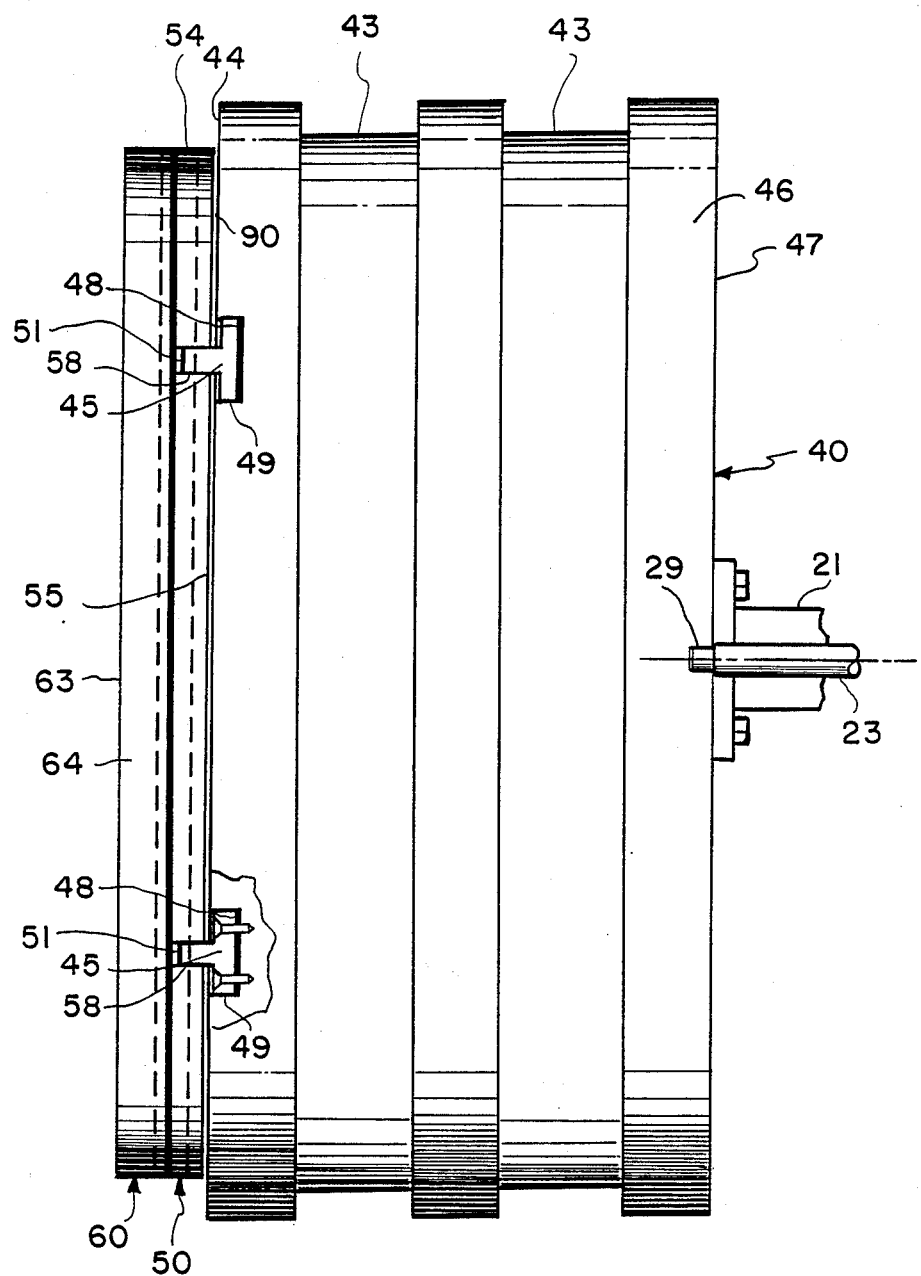
FIG. 7 is a cut-away close-up top view of the shear block, preload ramp, seal ring, and forward tee-bars shown in FIG. 5.

Referring now to FIG. 4, two parallel grooves 43, with rectangular cross sections, are cut out along the outer surface 46 on each shear block 40. Also, two forward tee bars 45 are mounted on the forward surface 44 of each shear block 40. Details of both the grooves 43 and the forward tee bars 45 are shown in FIG. 7. Two parallel rectangular recesses 49 cut along the conical forward surface 44 of each shear block 40. The recesses 49 are cut parallel to the reference line passing through each shear block 40, and are equally spaced on either side of the reference line. The recesses 49 are also cut parallel to the rearward surface 47. Each forward tee bar 45 is attached within each recess 49 by means such as screws, with shims 48 disposed between the tee bar 45 and the recess 49. Each tee bar 45 is mounted so that it is parallel to the rearward surface 47.

Referring again to FIG. 4, the circular opening 81 of the pressure vessel 80 provides access to its interior. The opening 81 is sized and located so that the cart assembly 10 can be moved forward to seal the opening 81, and moved rearward when access is required. The opening 81 is formed by an axial wall 82, a forward axial wall 84 of smaller diameter, and a rearward facing shoulder 85 formed at the intersection of the two. The axial wall 82 has three annular flanges 88 protruding therefrom, and sized so that the forward two fit within the grooves 43 of the shear blocks 40. A hole in the pressure vessel 80, drilled radially outward from the axial wall 84, serves as a leak check port 86.

The end closure plug 70 is a solid cylindrical piece formed by an outer surface 71, a forward outer surface 72 of greater diameter than outer surface 71, and a rearward facing shoulder 73 formed at the intersection of the two. The end closure plug 70 is sized to fit within opening 81 so that the diameter of the forward outer surface 72 is approximately the same as the diameter of the forward axial wall 84 of opening 81. A primary seal 74 is located on the forward outer surface 72 at its most forward end, sized to contact the forward axial wall 84.

Referring now to FIG. 5(a), when end closure plug 70 is sealed within the opening 81, an annular gap 87 is formed defined by the outer surface 71 and the shoulder 73 of the end closure plug 70, and the axial wall 82 and the shoulder 85 of the opening 81. The shear blocks 40 and the wedge ring 30 fit within the gap 87, with the two most forward flanges 88 disposed within the two grooves 43 of the shear blocks 40. The preload ramp 50 and the seal ring 60 together sit within the gap 87, between the conical forward surface 44 of the shear blocks 40, and both the shoulder 73 of the end closure plug 70 and the shoulder 85 of the pressure vessel opening 81.

Referring again to FIG. 4, the preload ramp 50 comprises a cylindrical main body formed with a longitudinal hole 52 therethrough. It is formed by a forward surface 53, a radially outward surface 54, and a conical rearward surface 55. The conical rearward surface 55 is at an angle with the forward surface 53 such that its distance from the forward surface 53 increases in the radially outward direction (details shown in FIG. 8). Eight recesses 58 are cut out of the conical rearward surface 55 at locations corresponding to the eight forward tee bars 45 of the shear blocks 40. As shown in FIG. 7, the recesses 58 form four sets of two tee guides 51 (only one set shown) within which the forward tee bars 45 sit.

Other details of the preload ramp 50 are shown in FIG. 9(a). The inner surface 59 of each recess 58 is at an angle with the conical rearward surface 55, but is parallel with the forward surface 53. The tee bars 45 extend up to the inner surface 59. A notch 56 is cut out along the peripheral edge of the forward surface 53, forming a shoulder 57 facing radially outward (also shown in FIG. 8).

Figure 8:
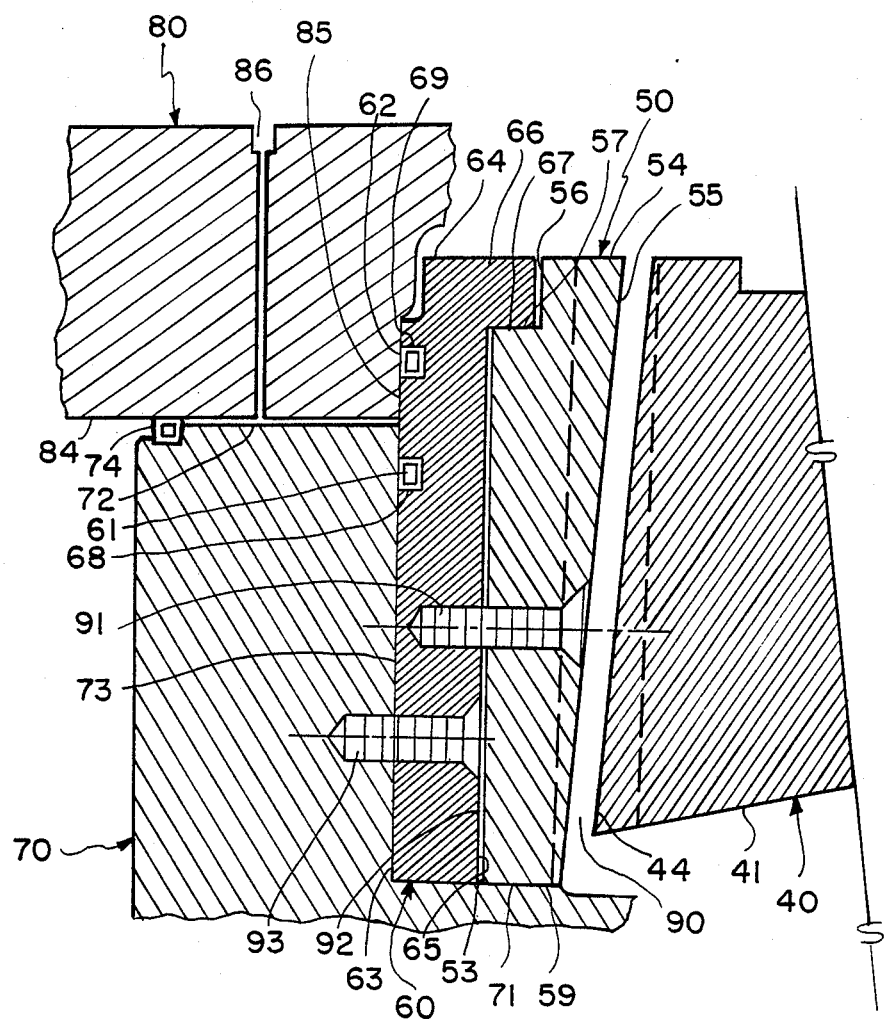
FIG. 8 is a cut-away close-up side view of the shear block, preload ramp, seal ring, and closure plug shown in FIG. 5.

Referring again to FIG. 4, the seal ring 60 has the same radial dimensions as the preload ramp 50. It is formed by a forward surface 63, a radially outward surface 64 perpendicular thereto, and a rearward surface 65 parallel with the forward surface 63. Details of the seal ring are shown in FIG. 8. A peripheral lip 66 extends rearward, disposed within notch 56 of the preload ramp 50, and having an axial surface 67 in contact with the shoulder 57. An annular inner groove 68 is cut into the forward surface 63, located so as to correspond with the shoulder 73 of the end closure plug 70. A first backup seal 61 is disposed within the inner groove 68. An annular outer groove 69 is cut into the forward surface 63, located so as to correspond with the shoulder 85 of the opening 81. A second backup seal 62 is disposed within the outer groove 69.

The preload ramp 50 and the seal ring 60 are attached together by a plurality of screws 91. Shims 92 are located between the forward surface 53 of the preload ramp 50 and the rearward surface 65 of the seal ring 60. The seal ring 60 is attached to the shoulder 73 of the end closure plug 70 by a plurality of screws 93.

The invention operates as follows to seal the opening 81 The cart assembly 10 is lined up with the opening 81 such that the centerline of the end closure plug 70 and the centerline of the opening 81 are aligned. The cart assembly 10 is wheeled forward so that the forward outer surface 72 of the end closure plug 70 slides within the forward axial wall 84 of the opening 81. The cart assembly 10 is moved forward until the forward surface of the seal ring 60 contacts the shoulder 85 of the opening 81. Using the air motor 12, the wedge ring 30 is moved forward.

Referring now to FIG. 5(b), as the wedge ring 30 moves forward, the mounting plates 37, engage the tee slots 42, forcing the four shear blocks 40 radially outward in the direction of each reference line. The shear blocks 40 are guided in two ways. First, the mounting plates 37 of each tee bar assembly 32 slide within the tee slots 42 (see FIG. 6). Second, the forward tee bars 45 slide within the tee guide 51 of the preload ramp 50, preventing the shear blocks 40 from moving forward, and preventing cocking and binding (see FIG. 7). The clearance 90 between the conical forward surface 44 of the shear blocks 40 and the conical rearward surface 55 of the preload ramp 50, as shown in FIG. 9(b), is decreased as the shear blocks 40 move outward. The air motor 12 is operated until the clearance 90 is zero, and the conical forward surface 44 and the conical rearward surface 55 contact one another, as shown in FIG. 5(a) and FIG. 9(a). This contact forces the shear blocks 40 slightly rearward, so that the rearward facing radial surfaces of the grooves 43 contact the flanges 88. The outer surfaces 46 of the shear blocks 40 do not contact the axial wall 82 of the opening 81. At this point, the invention is in its "locked" position, and the pressure vessel 80 may be pressurized.

In this locked position, as shown in FIG. 5(a), the end closure plug 70 is locked within the opening 81. Pressure within the pressure vessel 80 will be transmitted from the end closure plug 70 to the locking grooves 43 of the shear blocks 40, which transmit the pressure load into the pressure vessel via the annular flanges 88. The internal gases and liquid within the pressure vessel 80 are precluded from leaking out by a primary seal 74, and backup seals 61 and 62. The primary seal 74 closes any gap between the forward outer surface 72 and the forward axial wall 84, thereby preventing gases from escaping. Any leakage that does occur can be measured by means such as a pressure transducer through the leak check port 86.

If the primary seal 74 should fail, the invention provides a backup sealing capability. Referring now to FIG. 8, the first backup seal 61 closes the gap between the shoulder 73 and the forward surface 63, thereby preventing gases from escaping along the shear block 40/end closure plug 70 interface. The second backup seal 62 closes the gap between the shoulder 85 and the forward surface 63, thereby preventing gases from escaping along the shear block 40/pressure vessel opening 81 interface.

The pressure vessel 80 is elongated outward when pressurized. The internal pressure also tends to compress the shear blocks 40. Both results tend to increase the distance between the shoulder 85 and the forward surface 63. The conical rearward surface 55 and the conical forward surface 44 interact to counteract this effect. Due to this interaction, pressure in the rearward direction tends to force the preload ramp 50 radially outward. Contact of the shoulder 57 with the lip 66 restricts this radial movement, and causes the seal ring to deflect into the shoulder 85. This provides a tight seal.

To prevent the internal pressure of the pressure vessel 80 from forcing the wedge ring 30 rearward, a locking assembly 75 is provided to transmit the force acting on each connecting rod 21 to the vertical plate 17. Referring now to FIG. 3, the four locking assemblies 75 each consist of two semi-tubular shells 76 rotatably attached to one another by hinge assemblies 77, and are supported by the lower horizontal plate 15 and upper horizontal plate 16 of the box structure 19 (not shown). Rearward of each pair of shells 76, a tubular locking adaptor 97 is attached to the vertical plate 17, and has a conical forward surface 98. Each screw jack shaft flange 96 has a rearward surface 99, which is located just forward of the shells 76 when the wedge ring 30 is in the locked position. In the locked position, before pressure is supplied to the pressure vessel 80, the shells 76 are secured around the screw jack shaft 27, abutting both the rearward surface 99 of the screw jack shaft flange 96, and the conical forward surface 98 of the locking adaptor 97. The shells 76 are locked together by means of a pivot bolt 78, which is secured between two locking flanges 79 by a nut 94. Due to the conical shape of the forward surface 98, the locked shells 76 provide a tight connection between the connecting rod 21 and the vertical plate 17. Therefore when pressure is applied to the pressure vessel 80, the screw jacks 20 will not be subjected to the rearward force of the wedge ring 30. Before unlocking the invention, the shells 76 are unlocked and pivoted out of the way of the flange 96.

The invention operates as follows to unlock the opening 81. By reversing the air flow to the air motor 12, the wedge ring 30 is moved rearward. Referring now to FIG. 6, the inward surface 38 of the tee bars 35 contact the tee slots 42 to effectuate an inward movement of the shear blocks 40, in the direction of each reference line.

Referring now to FIG. 5(b), the inward movement of the shear blocks 40 disengages the grooves 43 from the flanges 88. Adjustable rod 23, held aligned with the connecting rod 21 by the guide 22, keeps the shear blocks 40 from moving rearward The forward tee bars 45 riding within the tee guides 51 (see FIGS. 9(a) and 9(b) prevent the shear blocks 40 from cocking and binding. The wedge ring 30 continues to move rearward, guided by the wedge ring supports 18 (shown in FIG. 6), until the locking grooves 43 clear the flanges 88. The cart assembly 10 may then be moved rearward, and moved aside for access to the pressure vessel 80.

Many adjustments can be made to the invention to optimize its operation. The shear blocks 40 are adjusted by the adjustable rod 23 and the forward tee bars 45. Referring now to FIG. 5(a), the threaded nut 26 is used to adjust the length of the adjustable rod 23 to set the maximum rearward position to which the shear blocks 40 may move. Referring now to FIG. 7, shims 48 between the forward tee bars 45 and recess 49 are added to adjust the forward position of the forward tee bars 45. This adjustment sets the maximum forward position to which the shear blocks 40 may move, and sets the correct clearance 90 necessary to ensure a correct final contact between the grooves 83 and the flanges 88 during the closure sequence.

Referring now to FIG. 8, the preload ramp 50 position relative to the seal ring 60 is adjusted by shims 92 placed between the rearward surface 65 and the forward surface 53. This allows for the proper adjustment of the seal ring 60 and the preload ramp 50 to accommodate tolerance buildup during fabrication.

Referring now to FIG. 6, the tee bar 35 position relative to the tee slot 42 may be adjusted to minimize the power required during unlocking. The shims 36 are used to adjust the tee bar 35 radial position so that a gap 39 exists between the inward surface 38 and the tee slots 42. Therefore, the initial rearward movement of the wedge ring 30 does not cause movement of the shear blocks 40. Power is minimized because the static friction of the surfaces does not have to be overcome at the same time. Only after the static friction between the wedge ring 30 and the shear blocks 40 is overcome do the tee bars 35 engage the tee slots 42. The static friction forces between the shear blocks 40 and pressure vessel 80 can then be overcome separately.

In addition to the above adjustments, power requirements are minimized by lubricating all sliding surfaces.

The invention has several novel features. These include the use of conical surfaces to move shear blocks into position and lock them in place, the use of tee guides and tee slots to disengage shear blocks from a locked position, and the use of conical surfaces to apply a preload to seal surfaces that counteracts the elongation of a pressure vessel when pressurized.

The invention has many advantages over prior art. All component parts of the closure are integrated into a single system, thereby negating the need for many large bolts, an overhead crane, an elaborate storage system, or many hours of labor. Sealing and unsealing operations are accomplished in a matter of minutes. The invention is compact, thereby minimizing interference with other piping or equipment. The contact surfaces between the shear blocks and pressure vessel opening have a minimum amount of wear, since final contact is not made until the last few thousandths of an inch of shear block outward movement. The amount of power required for the invention is minimized, since the static force between the shear blocks, pressure vessel, and wedge ring are overcome at different times during disengagement.

Anyone skilled in the art of closure devices should realize that the invention can be used for many other purposes, such as autoclaves, containers, and vacuum chambers. Although the preferred embodiment has been described in detail, it should be recognized that numerous other modifications, substitutions, and changes may be made to the invention without departing from the spirit hereof.

What is claimed as new and desired to be secured by Letters Patent of the United States is:

1. A quick actuating closure for a pressure-sustaining vessel comprising:

a wedge ring vertically supported and horizontally slidable, having a conical outer surface;

means to move said wedge ring forward and rearward;

a plurality of shear blocks sized to fit together around said wedge ring, with conical inner surfaces, annularly grooved outer surfaces, and means attached to limit rearward movement;

said conical outer surface of said wedge ring and said conical inner surfaces of said shear blocks slidably communicating, with protruding and receiving means between said surfaces to both restrict rotational movement and to cause radially inward movement of said shear blocks from a rearward movement of said wedge ring;

an opening in said pressure-sustaining vessel with an axial wall having annuar flanges protruding therefrom, sized to fit within said annularly grooved outer surfaces of said shear blocks; and an end closure plug sized to fit within said opening with means to seal said opening, and means to transmit rearward pressure to said shear blocks;

whereby forward movement of said wedge ring forces said shear blocks radially outward until said annularly grooved outer surfaces of said shear blocks contact said annular flanges of said opening, forming a locked position, securing said end closure plug within said opening when a positive pressure exists within said pressure-sustaining vessel; and whereby rearward movement of said wedge ring and the interaction between said protruding means and said receiving means forces said shear blocks radially inward until said annularly grooved outer surfaces of said shear blocks clear said axial wall of said opening, forming an unlocked position, allowing said end closure plug to be removed from said opening.

2. The quick actuating closure of claim 1, wherein a backup sealing means is additionally provided comprising:

a rearward facing peripheral shoulder formed with said end closure plug;

a rearward facing shoulder within said opening forward of said annular flanges, and aligned with said shoulder of said end closure plug when said end closure plug is disposed within said opening;

a seal ring with a forward surface contacting both said shoulder of said end closure plug and said shoulder of said opening, with seal means disposed between each surface, and with a peripheral lip extending rearward;

a preload ramp longitudinally disposed between said seal ring and said shear blocks with a forward surface contacting said seal ring, a peripheral notch within said forward surface wherein said peripheral lip of said seal ring is disposed, and a conical rearward surface; and conical forward surfaces formed within each said shear block, generally parallel with said conical rearward surface of said preload ramp, and sized so that the conical forward surfaces of said shear blocks contact said conical rearward surface of said preload ramp when in said closed position;

whereby interaction between said conical forward surfaces of said shear blocks and said conical rearward surface of said preload ramp, and interaction between said notch of said preload ramp and said lip of said seal ring, when rearward pressure is applied to said end closure plug, force said seal ring forward to effectuate a tight seal.

3. The quick actuating closure of claim 1, wherein a shear block guiding means is additionally provided comprising:

a rearward facing shoulder within said opening forward of said annular flanges;

a preload ramp longitudinally disposed between said shoulder of said opening and said shear blocks, with a conical rearward surface; and conical forward surfaces formed within each said shear block, generally parallel with said conical rearward surface of said preload ramp, and sized so that a clearance exists between said conical forward surfaces and said conical rearward surface of such magnitude that radially outward movement of said shear blocks will not cause said surfaces to contact each other until said grooved outer surfaces of said shear blocks almost contact said axial wall of said opening;

said conical forward surfaces of said shear blocks and said conical rearward surface of said preload ramp having protruding and receiving means therebetween to radially guide said shear blocks inward and outward;

whereby said radially outward movement of said shear blocks is guided perpendicular to said opening until said clearance between said shear blocks and said preload ramp is zero; and whereby further outward movement of said shear blocks causes said conical forward surfaces of said shear blocks and said conical rearward surface of said preload ramp to interact causing said shear blocks to travel rearward into said opening.

4. The quick actuating closure of claim 1, wherein said protruding and receiving means comprises:

a "T"-shaped slot formed longitudinally within said conical inner surface of each said shear block, located at the circumferential center of said shear block; and a plurality of "T"-shaped bars protruding longitudinally from said conical outer surface of said wedge ring, each corresponding in position and size to said "T"-shaped slots of said shear blocks;

whereby said "T"-shaped bars ride within said "T"-shaped slots to preclude rotational movement of said shear blocks, and to effectuate inward movement of said shear blocks when said wedge ring moves rearward.

5. The quick actuating closure of claim 1, wherein said means to move said wedge ring forward and rearward comprises:

a plurality of connecting rods protruding rearwardly from said wedge ring;

screw jack means communicating with each said connecting rod and capable of moving all said connecting rods forward and rearward simultaneously;

locking means to withstand rearward force acting on said connecting rods; and motor means communicating with said screw jack means capable of two direction operation of said screw jack means.

6. The quick actuating closure of claim 5, wherein said locking means comprises:
   a first flange structurally attached between each said connecting rod and said screw jack means;
   a second flange longitudinally in line with said first flange, structurally attached to a force-bearing structure, and having a conical surface facing said first flange; and
   two semi-tubular shells rotatably secured to said force-bearing structure, capable of abutting together to form a tubular structure secured tightly between said first flange and said second flange;
   whereby rearward force acting on said first flange is transmitted to said second flange and into said force-bearing structure.

7. The quick actuating closure of claim 3, wherein said protruding and receiving means comprises:
   a protruding guide means attached to said conical forward surface of each said shear block parallel to the geometric radial line along which each said shear block moves inward and outward; and
   a recess cut within said conical rearward surface of said preload ramp at each location corresponding to said protruding guide means of said shear blocks, sized and located so that said protruding guide means ride smoothly but securely within said recesses when said shear blocks are travelling along said geometric radial line.

8. The quick actuating closure of claim 1, wherein a combined backup sealing means and shear block guiding means is provided comprising:
   a rearward facing peripheral shoulder formed with said end closure plug;
   a rearward-facing shoulder within said opening forward of said annular flanges, and aligned with said shoulder of said end closure plug when said end closure plug is disposed within said opening;
   a seal ring with a forward surface contacting both said shoulder of said end closure plug and said shoulder of said opening, with seal means disposed between each surface, and with a peripheral lip extending rearward;
   a preload ramp longitudinally disposed between said seal ring and said shear blocks with a forward surface contacting said seal ring, a peripheral notch within said forward surface wherein said peripheral lip of said seal ring is disposed, and a conical rearward surface; and
   conical forward surfaces formed within each said shear block, generally parallel with said conical rearward surface of said preload ramp, and sized so that a clearance exists between said conical forward surfaces and said conical rearward surface of such magnitude that radially outward movement of said shear blocks will cause said surfaces to contact each other when said grooved outer surfaces of said shear blocks contact said axial wall of said opening;
   said conical forward surfaces of said shear blocks and said conical rearward surface of said preload ramp having protruding and receiving means therebetween to radially guide said shear blocks inward and outward;
   whereby said radially outward movement of said shear blocks is guided perpendicular to said opening until said clearance between said shear blocks and said preload ramp is zero;
   whereby further outward movement of said shear blocks causes the said conical forward surfaces of said preload ramp to interact causing said shear blocks to travel rearward into said flanges of said opening; and
   whereby interaction between said conical forward surface of said shear blocks and said conical rearward surface of said preload ramp, and interaction between said notch of said preload ramp and said lip of said seal ring, when rearward pressure is applied to said end closure plug, force said seal ring forward to effectuate a tight seal.

9. The quick actuating closure of claim 8, wherein a mobile self-contained cart assembly is additionally provided comprising:
   a mobile cart with a first structural means to support said means to move said wedge ring forward and rearward; and
   a second structural means attached to said mobile cart capable of protruding into said opening of said pressure-sustaining vessel;
   said end closure plug attached to said second structural means;
   said seal ring attached to said shoulder of said end closure plug;
   said preload ramp attached to said seal ring;
   said wedge ring supported by and disposed around said second structural means so that it is capable of forward and rearward movement; and
   said shear blocks disposed around said wedge ring, and rearward of said preload ramp;
   whereby said mobile self-contained cart assembly can be used to seal and unseal said opening of said pressure vessel, and can be moved away from said opening for access thereto.

10. A quick actuating closure for a pressure sustaining vessel comprising:
    a mobile cart assembly with a vertical plate supporting an integrally connected air motor means, gear box means, and four screw jack means, communicating so that each said screw jack means is capable of moving a screw jack shaft forward and rearward;
    said mobile cart also comprising a cantilevered box structure protruding forward from and attached to said vertical plate, with an end closure plug attached to its forward end, and with four curved plates attached to and equally spaced around the periphery of said box structure, with said plates sized to vertically support an inner tubular surface of a wedge ring while allowing longitudinal movement;
    said wedge ring having a cylindrical inner surface and conical outer surface with the distance between the two surfaces increasing in the rearward direction, with four "T"-shaped tee bars spaced 90° apart, attached to said conical outer surface, and capable of radial adjustment;
    said wedge ring having four connecting rods attached 90° apart and protruding rearwardly, connected to said screw jack shafts of said screw jack means;
    said screw jack shafts having locking means to transmit rearward force to said vertical plate;
    said end closure plug comprising a solid cylinder with its rearward peripheral edge notched so as to form a rearward facing shoulder and outwardly facing outer surface;

said end closure plug sized to fit securely in an opening of said pressure-sustaining vessel while attached to said box structure of said cart assembly, and comprising a primary seal to contact an axial wall of said opening;

said end closure plug having a seal ring and a preload ramp attached to its said shoulder by a plurality of screws and shims;

said seal ring comprising a cylindrical body formed with a longitudinal hole therethrough, with forward and rearward facing surfaces parallel to each other, with a radially outward surface perpendicular thereto, and with a peripheral lip extending rearward;

said forward facing surface of said seal ring having an annular inner groove with a first backup seal disposed therein, with a diameter allowing said first backup seal to contact said end closure plug shelf, and having an annular outer groove with a second backup seal disposed therein;

said preload ramp comprising a cylindrical body of the same radial dimensions as the said seal ring, with a forward facing surface and a conical rearward facing surface, the distance between the two surfaces increasing in the radially outward direction;

said conical rearward surface of said preload ramp having four pairs of rectangular recesses cut therein, with the two recesses of each pair parallel to each other and extending from the radially inner surface of said preload ramp to its radially outer surface, with each pair equally spaced around the circumference of said rearward surface, and the recesses cut as to be parallel to the said forward surface of said preload ramp;

said forward surface of said preload ramp having a peripheral notch cut therein, forming a radially outward facing shoulder;

said opening of said pressure-sustaining vessel comprising an axial wall, a forward axial wall of smaller diameter, and a rearward facing shoulder formed at the intersection of the two upon which the said second backup seal of said seal ring sits;

said axial wall of said opening having three annular flanges protruding therefrom;

four quarter-circular shear blocks sized to fit around the said wedge ring, formed by conical inner surfaces, cylindrical outer surfaces, conical forward facing surfaces, and rearward facing surfaces perpendicular to said outer surfaces, arranged so that the longitudinally forward end is the thickest radially, and the radially inner end is the thickest longitudinally;

each said inner surface of said shear block having one "T"-shaped slot cut longitudinally therein, spaced and sized to correspond to said tee bars of said wedge ring;

each said outer surface of said shear block having two parallel grooves cut therein, spaced and sized to correspond to the two most forward of said annular flanges of said axial wall of said opening;

said conical forward surface of each said shear block having two recesses cut therein, spaced and sized to correspond to one said pair of recesses of said preload ramp, and having "T"-shaped tee bars attached therein with longitudinal adjustment capability;

longitudinally adjustable rod means attached to the said vertical plate and contacting said shear blocks to limit rearward movement of said shear blocks;

whereby said opening is sealed by moving said cart assembly to place said end closure plug within said opening, operating said air motor means to move said wedge ring forward, thereby forcing said shear blocks radially outward, guided by both said tee bar assemblies and said forward tee bars, until said outer surface of said shear blocks contacts said axial wall of said opening simultaneously with the contact of said conical forward surface of said shear blocks with said conical rearward surface of said preload ramp;

whereby said locking means of said threaded rods are locked;

whereby said pressure-sustaining vessel may be pressurized with no leakage of gas or liquid, with pressure acting on said end closure plug transmitted to said pressure-sustaining vessel via said seal ring, said preload ramp, said shear blocks, and said annular flanges of said opening, and with said conical rearward surface of said preload ramp and said conical forward surface of said shear blocks interacting so as to deflect said seal ring into said shoulder of said opening;

whereby said opening is unsealed by operating said motor means to move said wedge ring rearward, thereby having said tee bars of said wedge ring contact said tee slots of said shear blocks to effectuate an inward movement of said shear blocks, thereby disengaging said grooves of said shear blocks from said flanges of said opening, said shear blocks guided by said forward tee bars and precluded from moving rearward by said adjustable rod, until said locking grooves of said shear blocks clear said flanges of said opening;

whereby said cart assembly may be moved aside for access to said pressure-sustaining vessel.

* * * * *